(12) United States Patent
Boblett et al.

(10) Patent No.: US 10,019,066 B2
(45) Date of Patent: *Jul. 10, 2018

(54) METHOD OF LAUNCHING AN APPLICATION AND SELECTING THE APPLICATION TARGET WINDOW

(71) Applicant: Tesla Motors, Inc., Palo Alto, CA (US)

(72) Inventors: Brennan Boblett, San Francisco, CA (US); Nalinichandra Penke, Fremont, CA (US); Roy Goldman, Cupertino, CA (US); Michael Fairman, Santa Cruz, CA (US); Kevin Hsieh, Redwood City, CA (US)

(73) Assignee: TESLA, INC., Palo Alto, CA (US)

( * ) Notice: Subject to any disclaimer, the term of this patent is extended or adjusted under 35 U.S.C. 154(b) by 544 days.

This patent is subject to a terminal disclaimer.

(21) Appl. No.: 13/765,363

(22) Filed: Feb. 12, 2013

(65) Prior Publication Data

US 2014/0096051 A1 Apr. 3, 2014

Related U.S. Application Data

(63) Continuation of application No. 13/764,942, filed on Feb. 12, 2013.
(Continued)

(51) Int. Cl.
*G06F 3/00* (2006.01)
*G06F 9/00* (2006.01)
(Continued)

(52) U.S. Cl.
CPC ........... *G06F 3/017* (2013.01); *B60G 17/015* (2013.01); *B60J 7/043* (2013.01); *G01C 21/3667* (2013.01);
(Continued)

(58) Field of Classification Search
CPC ........ G06F 9/4443; G06F 8/34; G06F 3/0486; G06F 8/38; G06F 3/0481; G06F 3/0482;
(Continued)

(56) References Cited

U.S. PATENT DOCUMENTS 4,866,776 A 9/1989 Kasai et al.
5,271,063 A 12/1993 d'Alayer de Costemore d'Arc
(Continued)

FOREIGN PATENT DOCUMENTS

| JP | 05-278469 A | 10/1993 |
| JP | 09-261800 | 10/1997 |
| KR | 10-2012-0014444 A | 2/2012 |

OTHER PUBLICATIONS

International Application No. PCT/US2013/056138, International Search Report dated Jan. 24, 2014, 5 pages.
(Continued)

*Primary Examiner* — Kieu Vu
*Assistant Examiner* — Anita D Chaudhuri
(74) *Attorney, Agent, or Firm* — Garlick & Markison; Bruce Garlick

(57) ABSTRACT

A method of launching a software program or application is provided for use with a graphical user interface (GUI) display. One portion of the GUI display includes a taskbar while a second portion is divided into a plurality of windows. To launch one of the programs/applications represented by the icons within the taskbar, the user first selects the icon representing the icon to be launched. When the user drags the selected icon into one of the windows and then releases the icon, the selected program/application is launched in the selected window.

14 Claims, 19 Drawing Sheets

Related U.S. Application Data

(60) Provisional application No. 61/706,915, filed on Sep. 28, 2012.

(51) Int. Cl.

| | | |
|---|---|---|
| *G06F 17/00* | (2006.01) | |
| *G06F 3/01* | (2006.01) | |
| *G06F 3/0481* | (2013.01) | |
| *H04S 7/00* | (2006.01) | |
| *G06F 3/0484* | (2013.01) | |
| *B60G 17/015* | (2006.01) | |
| *B60J 7/043* | (2006.01) | |
| *G01C 21/36* | (2006.01) | |
| *G06F 3/0488* | (2013.01) | |

(52) U.S. Cl.
CPC ....... *G01C 21/3697* (2013.01); *G06F 3/0488* (2013.01); *G06F 3/04817* (2013.01); *G06F 3/04842* (2013.01); *G06F 17/00* (2013.01); *H04S 7/303* (2013.01)

(58) Field of Classification Search
CPC . G06F 3/04812; G06F 3/04847; G06Q 10/10; H04N 1/00389; H04N 1/00411
See application file for complete search history.

(56) References Cited

U.S. PATENT DOCUMENTS

| | | | |
|---|---|---|---|
| 6,204,847 B1* | 3/2001 | Wright | G06F 3/038 715/803 |
| 8,095,278 B2 | 1/2012 | Schaaf et al. | |
| 2001/0043198 A1 | 11/2001 | Ludtke | |
| 2005/0105744 A1 | 5/2005 | Lee | |
| 2005/0135636 A1 | 6/2005 | Putti et al. | |
| 2005/0152562 A1 | 7/2005 | Holmi et al. | |
| 2005/0254775 A1* | 11/2005 | Hamilton | G06F 9/4443 386/210 |
| 2005/0271219 A1 | 12/2005 | Bruelle-Drews | |
| 2005/0280524 A1 | 12/2005 | Boone et al. | |
| 2006/0262935 A1 | 11/2006 | Goose et al. | |
| 2007/0101297 A1* | 5/2007 | Forstall et al. | 715/841 |
| 2008/0207188 A1* | 8/2008 | Ahn | G06F 3/04847 455/418 |
| 2008/0302014 A1 | 12/2008 | Szczerba et al. | |
| 2009/0122018 A1* | 5/2009 | Vymenets | G06F 3/04817 345/173 |
| 2011/0082627 A1* | 4/2011 | Small et al. | 701/48 |
| 2011/0087982 A1* | 4/2011 | McCann et al. | 715/769 |
| 2011/0087989 A1* | 4/2011 | McCann et al. | 715/772 |
| 2011/0138314 A1* | 6/2011 | Mir et al. | 715/779 |
| 2011/0282537 A1 | 11/2011 | Yamasaki et al. | |
| 2012/0084692 A1* | 4/2012 | Bae | 715/769 |
| 2012/0311498 A1* | 12/2012 | Kluttz | G06F 3/0481 715/825 |

OTHER PUBLICATIONS

International Application No. PCT/US2013/055595, International Search Report dated Jan. 24, 2014, 5 pages.

* cited by examiner

METHOD OF LAUNCHING AN APPLICATION AND SELECTING THE APPLICATION TARGET WINDOW

CROSS-REFERENCE TO RELATED APPLICATION

This application is a continuation of U.S. patent application Ser. No. 13/764,942, filed 12 Feb. 2013, the disclosure of which is incorporated herein by reference for any and all purposes. This application claims the benefit of the filing date of U.S. Provisional Patent Application Ser. No. 61/706,915, filed 28 Sep. 2012, the disclosure of which is incorporated herein by reference for any and all purposes.

FIELD OF THE INVENTION

The present invention relates generally to a user interface and, more particularly, to a method of launching an application on a user interface.

BACKGROUND OF THE INVENTION

A conventional computer interface provides a variety of simplified techniques that can be used to select and activate a particular program or application. While the nomenclature and some of the launch features vary depending upon the operating system, in general these techniques allow a shortcut for the desired program/application to be placed directly on the desktop or within a taskbar or dock located at a screen edge, for example along the top or bottom of the screen. When the user selects a particular program/application, either by tapping (or double tapping) on the program/application icon if the interface is a touch-screen, or selecting the program/application by clicking (or double clicking) on the icon using a mouse, the program/application opens up on the screen. Generally the program/application will open in a full screen mode, i.e., maximized to cover the entire screen window. In some operating systems, if the program/application was minimized prior to its last closure, when re-opened it will re-open in the same size window as when it was closed. Similarly, if the program/application was minimized prior to its last closure, when re-opened the program/application will typically be located in the same location on the screen as where it was when it was last closed.

When a touch-screen or mouse-controlled user interface is used in a vehicle, the driver is often required to open an application, input data, or otherwise interact with the interface in a rushed manner and while performing other tasks related to driving the car. In this and similar scenarios, conventional application shortcuts may provide the user with insufficient control. Accordingly, what is needed is shortcut technique that optimizes user control over the opening application, thus minimizing user interaction while still providing the user with the desired level of control. The present invention provides such a user interface.

SUMMARY OF THE INVENTION

A method for launching programs, e.g., software programs and applications, on a graphical user interface (GUI) display is provided, the method including the steps of (i) providing a taskbar on a first portion of the GUI display; (ii) displaying a plurality of icons within the taskbar, where each of the icons represents a corresponding one of a plurality of programs; (iii) configuring a second portion of the GUI display into a plurality of pre-sized windows; (iv) accepting a user selection of a selected icon of the plurality of icons located within the taskbar, where the selected icon represents the software application to be launched; (v) allowing the user to drag the selected icon from an initial location on the taskbar to a selected window of the plurality of windows; and (vi) launching the software application in the selected window when the selected icon is released by the user within the selected window. The user can select/drag an icon using a click-and-hold operation of a mouse controller button and then release the icon by unclicking the mouse controller button or, in the case of a touch-screen, touch an icon to select it and then release the selected icon by removing their finger from the selected icon at the desired location.

In another aspect, a semi-transparent interface screen corresponding to the software application is displayed on each of the plurality of windows as the selected icon is positioned within the corresponding window. Then, when the user releases the selected icon, the semi-transparent interface screen completely materializes in the selected window.

In another aspect, the GUI display may be mounted in a vehicle and the plurality of programs may include one or more applications corresponding to entertainment system applications, navigation system applications, energy tracking applications, browser applications, camera applications and phone applications.

In another aspect, a plurality of persistent controls are provided on a third portion of the GUI display, where the persistent controls may include one or more of passenger cabin temperature controllers, vehicle seat warmer controllers, audio volume controllers, defroster controllers and general vehicle setting controllers.

In another aspect, when an icon is selected its appearance changes, for example the icon may be enlarged or the color of the icon may change when it is selected.

In another aspect, after the software application is launched the user can toggle between a window mode and a full-screen mode by tapping, or clicking, on the selected icon.

In another aspect, the user can immediately launch the software application in a full-screen mode, thereby bypassing the step of dragging the selected icon to one of the windows, by double tapping, or double clicking, the selected icon.

A further understanding of the nature and advantages of the present invention may be realized by reference to the remaining portions of the specification and the drawings.

DESCRIPTION OF THE SPECIFIC EMBODIMENTS

The preferred embodiment of the present invention utilizes a large format screen, preferably a touch-screen, which is of sufficient size to allow multiple windows to be opened. It will be appreciated that the screen size required for multiple window viewing depends upon a number of factors, including the user. Thus while the preferred embodiment utilizes a 17-inch touch-screen with a 16:10 aspect ratio, other embodiments may utilize both smaller and larger screen sizes.

In the illustrated embodiment, the touch-screen display is used in a vehicle, both as a visual aid and as a means of controlling multiple vehicle subsystems. It should be understood that the invention may also be used in non-vehicle applications (e.g., desktop computer, laptop computer, tablet, smartphone, etc.). If used within a vehicle compartment, preferably the display is mounted within the vehicle's central console, thus providing access to the data on the screen as well as the displayed system controls to both the driver and the passenger seated in the passenger front seat.

Figure 1:
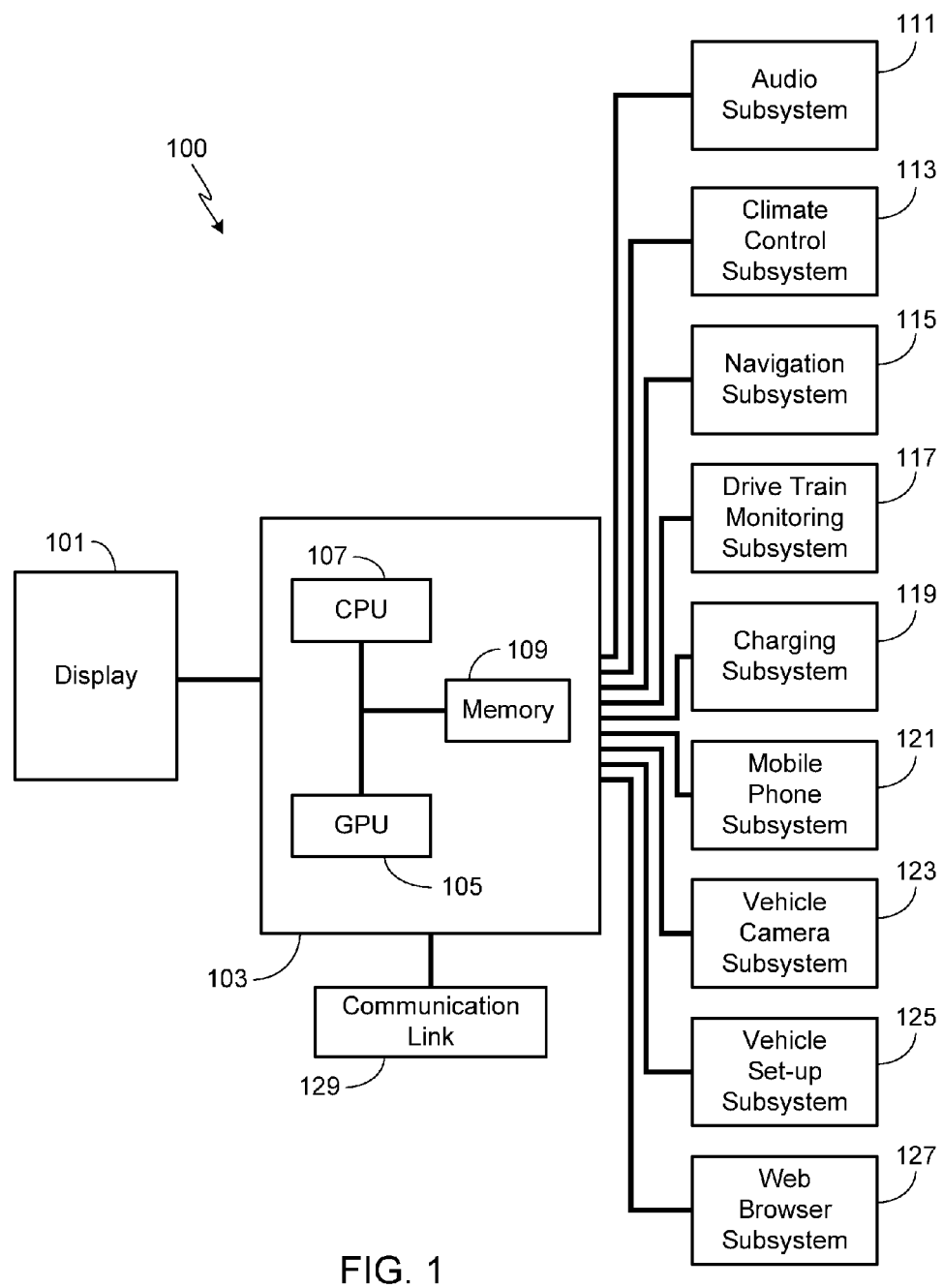
FIG. 1 provides a block diagram of an exemplary interface system that may be used with the present invention.

FIG. 1 provides a block diagram of an exemplary interface system 100 that includes touch-screen 101 and is suitable for use with the invention. In system 100, display 101 is coupled to a system controller 103. Controller 103 includes a graphical processing unit (GPU) 105, a central processing unit (CPU) 107, and memory 109. CPU 107 and GPU 105 may be separate or contained on a single chip set. Memory 109 may be comprised of flash memory, a solid state disk drive, a hard disk drive, or any other memory type or combination of memory types. Controller 103 is coupled to a variety of different vehicle subsystems, including the vehicle subsystem controls and vehicle subsystem monitors that are to be accessed and/or viewed on display 101. Exemplary subsystems include audio subsystem 111, climate control subsystem 113, navigation subsystem 115, drive train monitoring subsystem 117, charging subsystem 119, mobile phone subsystem 121, vehicle camera subsystem 123, vehicle set-up subsystem 125 and web browser subsystem 127. Vehicle set-up subsystem 125 allows general vehicle operating conditions to be set, conditions such as seat position, moon roof or sun roof position/operation, internal and external lighting, windshield wiper operation, etc. Preferably a mobile telecommunications link 129 is also coupled to controller 103, thereby allowing the controller to obtain updates, interface configuration profiles, and other data from an external data source (e.g., manufacturer, dealer, service center, web-based application, remote home-based system, etc.). Mobile telecommunications link 129 may be based on any of a variety of different standards including, but not limited to, GSM EDGE, UMTS, CDMA2000, DECT, and WiMAX.

Figure 2:
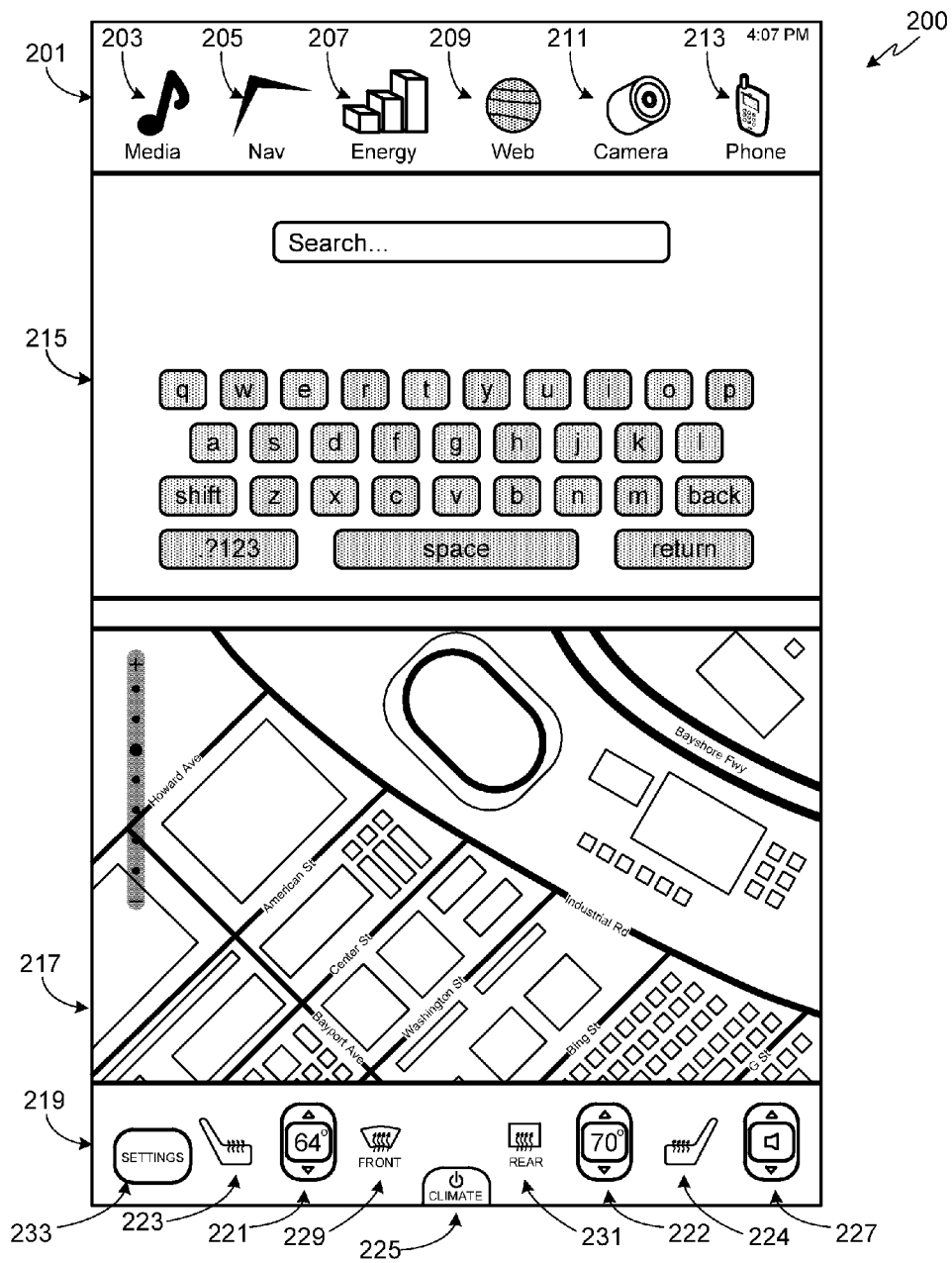
FIG. 2 illustrates an exemplary GUI screen.

FIG. 2 provides an exemplary screen 200. It should be understood that the icons and information shown on this and subsequent graphical user interface (GUI) screens is for illustration purposes only and that the invention is equally applicable to screens utilizing a different format, size or configuration as well as interfaces utilizing different operating systems, different programs/applications, etc. Furthermore, it should be understood that the terms "program", "application" and "program/application" are used interchangeably throughout this specification.

A GUI display configured for use with the invention, regardless of whether the display is a touch-screen as preferred or a non-touch-screen, includes a dedicated taskbar region 201. Although taskbar region 201 is shown positioned at the top of GUI screen 200, it will be appreciated that it could be located elsewhere (e.g., at the bottom of the screen, along a side of the screen, etc.). Within taskbar 201 are icons representative of the applications that provide the user with shortcut access to each of the designated applications, for example applications that control various vehicle subsystems. In one embodiment the application shortcuts located within the taskbar are configured by a third party (e.g., the system or vehicle manufacturer) while in another embodiment the application shortcuts located within the taskbar are configured by the end user. Typically the shortcuts in taskbar 201 are for those applications for which frequent access is desired. In the exemplary GUI screen the illustrated shortcuts are for a media/audio/entertainment system application (i.e., media icon 203), a navigation system application (i.e., navigation icon 205), an energy tracking application that monitors battery usage/charging (i.e., energy icon 207), a browser application (i.e., web icon 209), a camera application for a back-up and/or forward view camera (i.e., camera icon 211), and a mobile/cell phone interface application (i.e., phone icon 213).

In accordance with the invention, a portion of the GUI display screen is divided into two or more windows that are used to display the selected applications. In the exemplary screen 200, two windows are shown with upper window 215 displaying web browser application 209 and lower window 217 displaying a map selected via navigation interface application 205. In the preferred embodiment, a selected window may be expanded to cover all of the windows, a particularly useful feature when either the web browser or the navigation system is selected. Additionally, in some embodiments the user can resize windows, for example allowing the lower window to cover 75% of the available display screen while the upper window covers only 25% of the available display screen.

In the illustrated GUI a portion 219 of the screen is used for persistent controls that remain on the display screen regardless of the applications being displayed on the screen. These persistent controls may be selected based on the need for frequent access (e.g., temperature controllers 221/222, seat warmers 223/224, climate controller 225 and audio volume controller 227, etc.) or for safety (e.g., front defroster controller 229, rear defroster controller 231, etc.). In the exemplary screen, a "settings" button 233 is also shown, which provides the user with instant access to the various vehicle settings (e.g., lights, sunroof control, etc.). The persistent controls may be configured by the user, the system/vehicle manufacturer, or by a third party.

Figure 3:
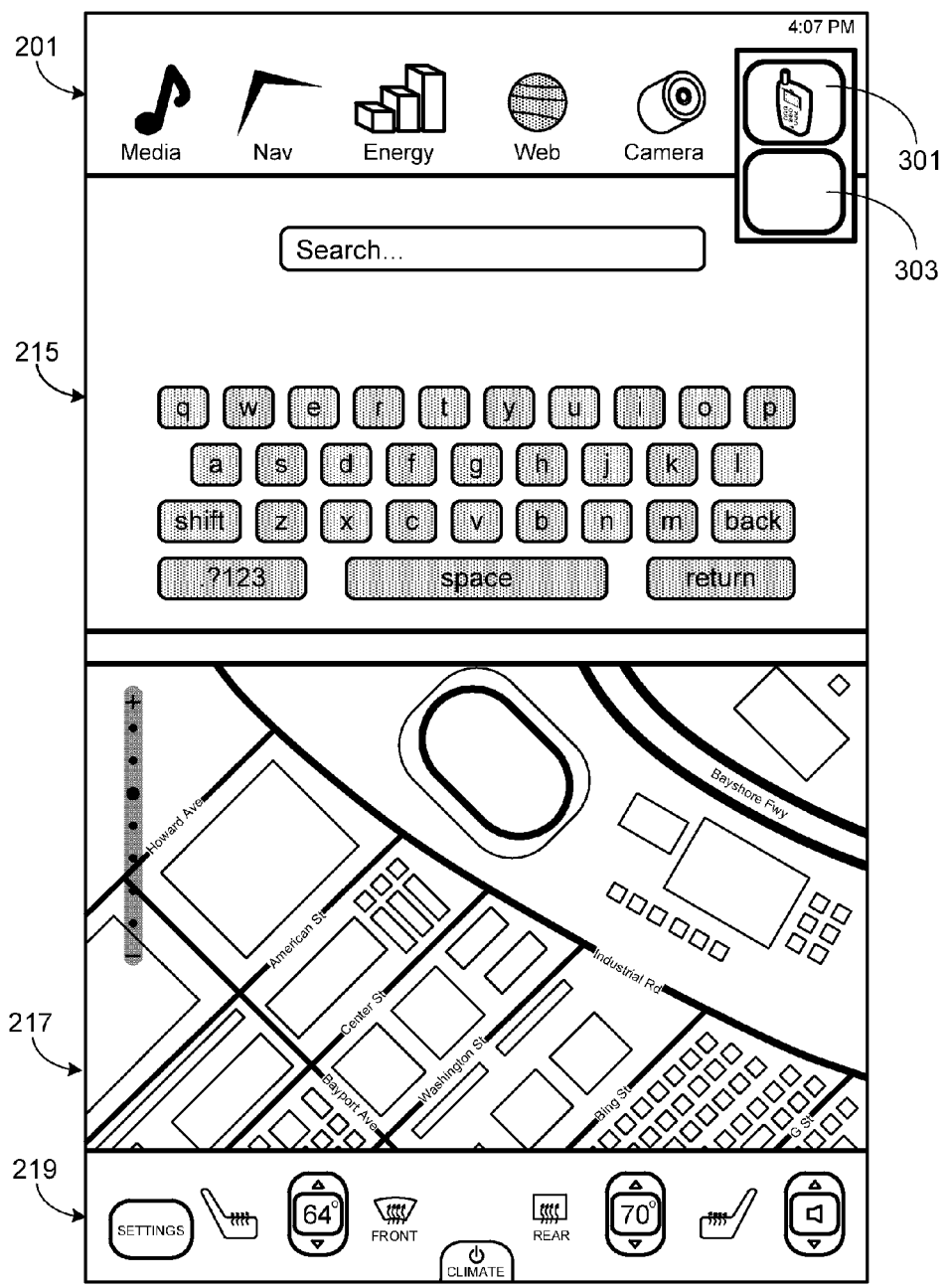
FIG. 3 illustrates an exemplary GUI screen based on the GUI screen shown in FIG. 2 after an application has been selected.
Figure 4:
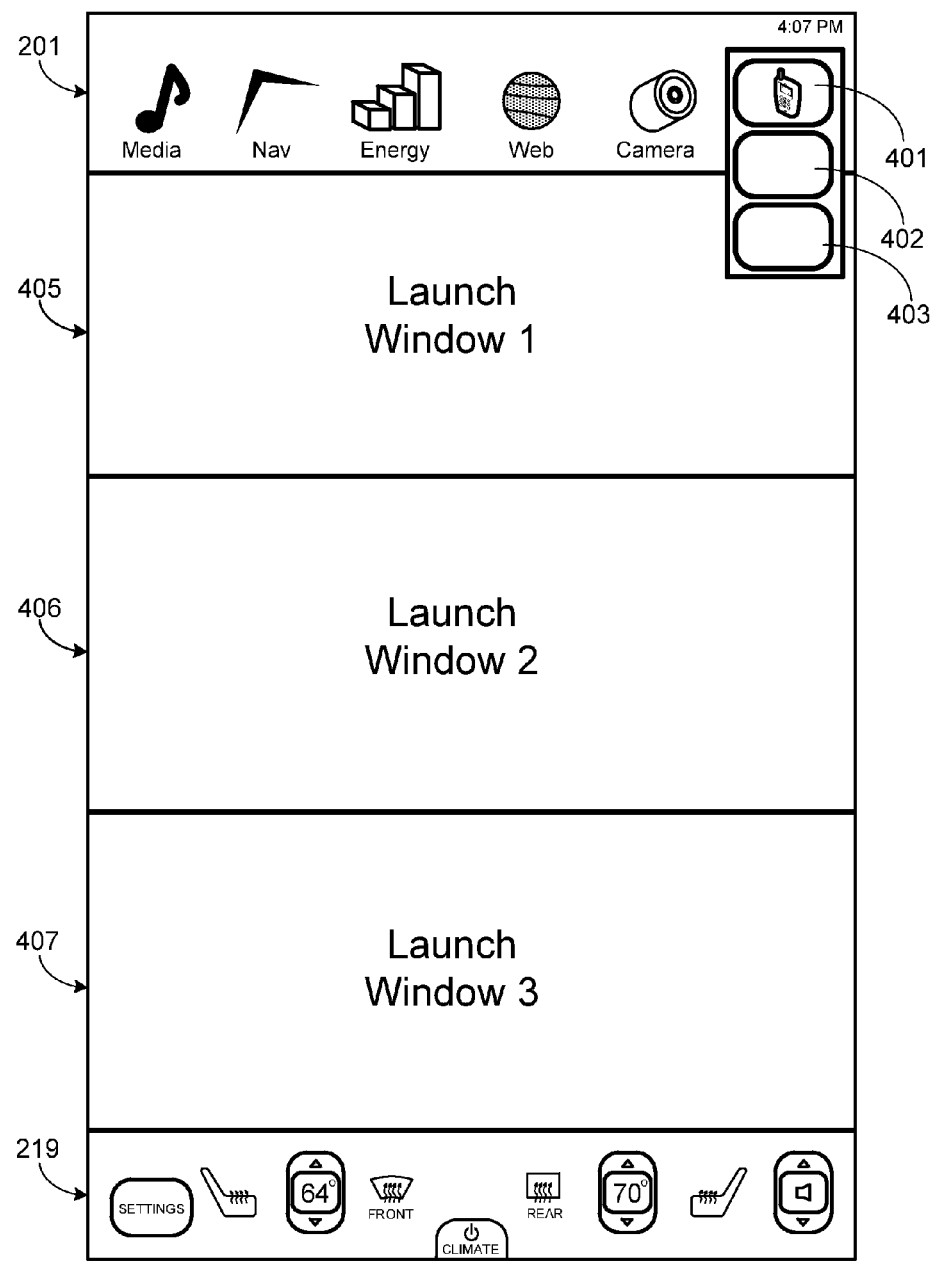
FIG. 4 illustrates an exemplary GUI screen with three available launch windows after an application has been selected.
Figure 5:
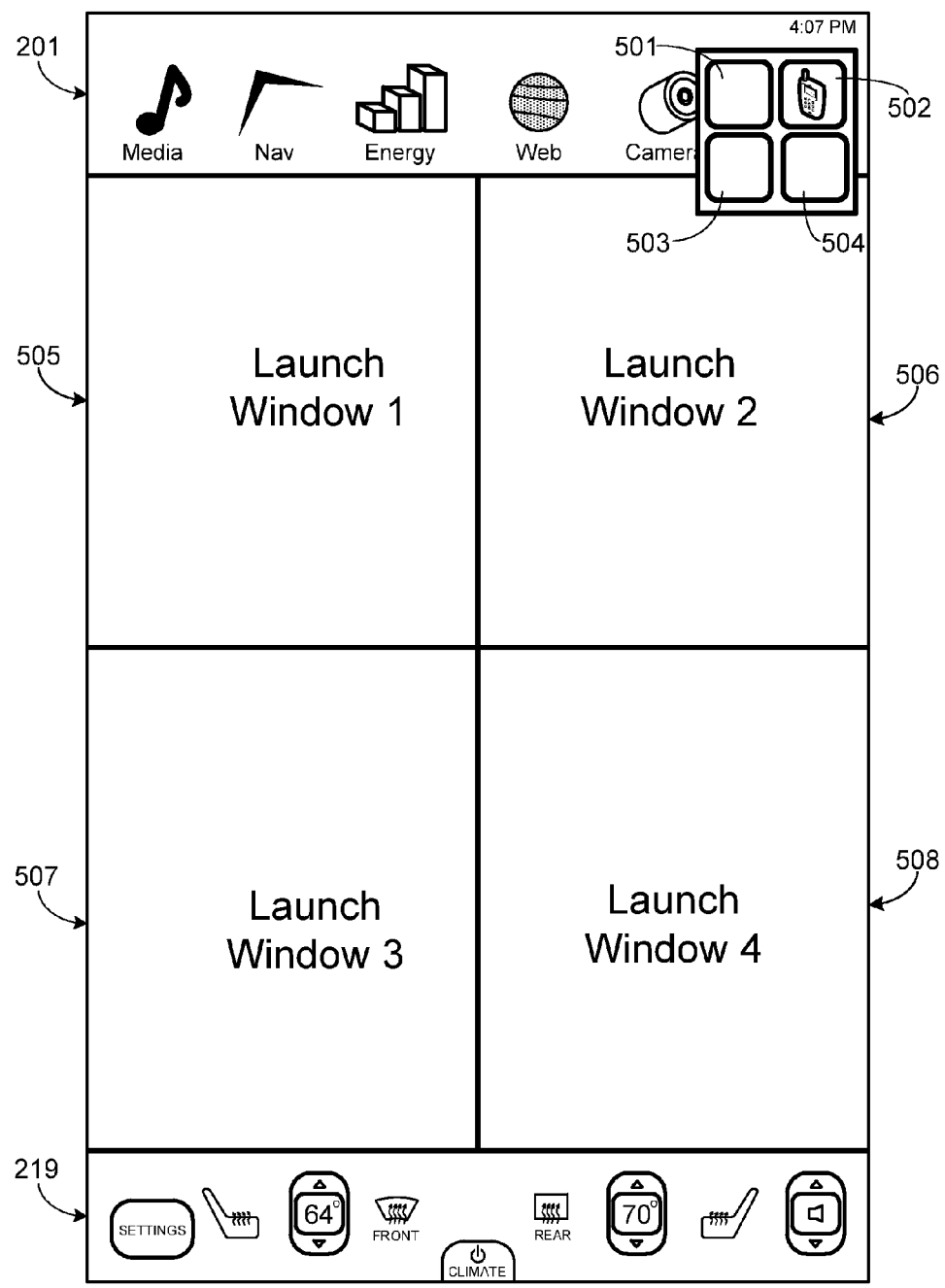
FIG. 5 illustrates an exemplary GUI screen with four available launch windows after an application has been selected.

In accordance with the invention, when a user selects an application within taskbar 201, either by touching the selected application if the GUI is a touch-screen or by selecting the application with a mouse if the GUI is not a touch-screen (or if the user prefers the use of a mouse rather than the touch-screen interface), the user is presented with a visual cue that represents the possible windows in which the application may be launched. For example, FIG. 3 illustrates the same GUI screen as shown in FIG. 2 after the user has first tapped (or otherwise selected) phone application 213. As shown, a miniature representation of the two available launch windows is graphically shown on the screen, where miniature window 301 represents upper window 215 and miniature window 303 represents lower window 217. It will be appreciated that other visual cues may be used to represent the available launch windows. Note that the visual cue shows all possible launch windows thus, for example, FIG. 4 illustrates a similar exemplary GUI with three possible launch windows 401-403 representing zones 405-407, respectively, while FIG. 5 illustrates a similar exemplary GUI with four possible launch windows 501-504 representing zones 505-508, respectively.

Figure 6:
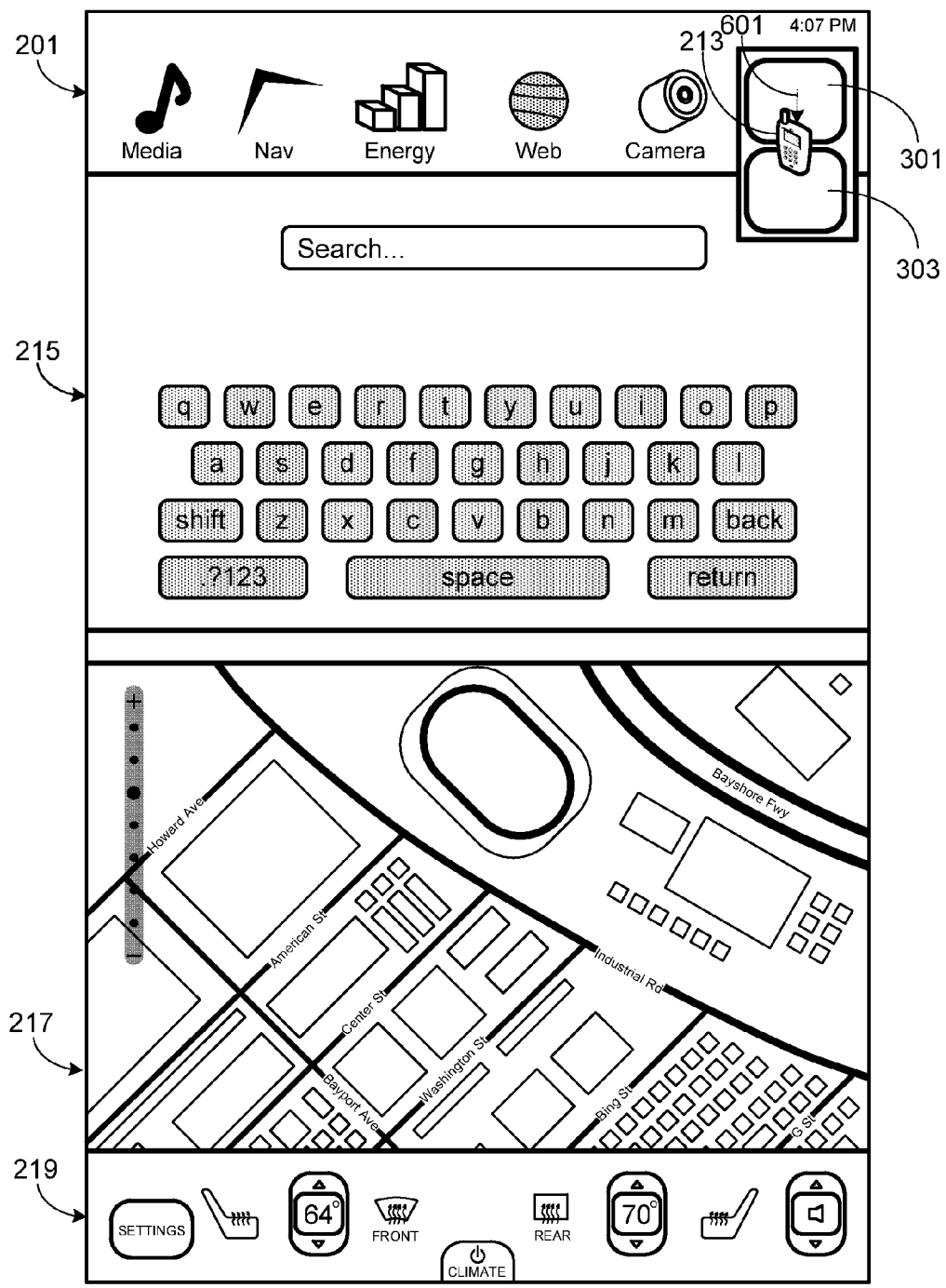
FIG. 6 illustrates the same view of the GUI screen as provided in FIG. 3 except for the motion of the phone application icon.
Figure 7:
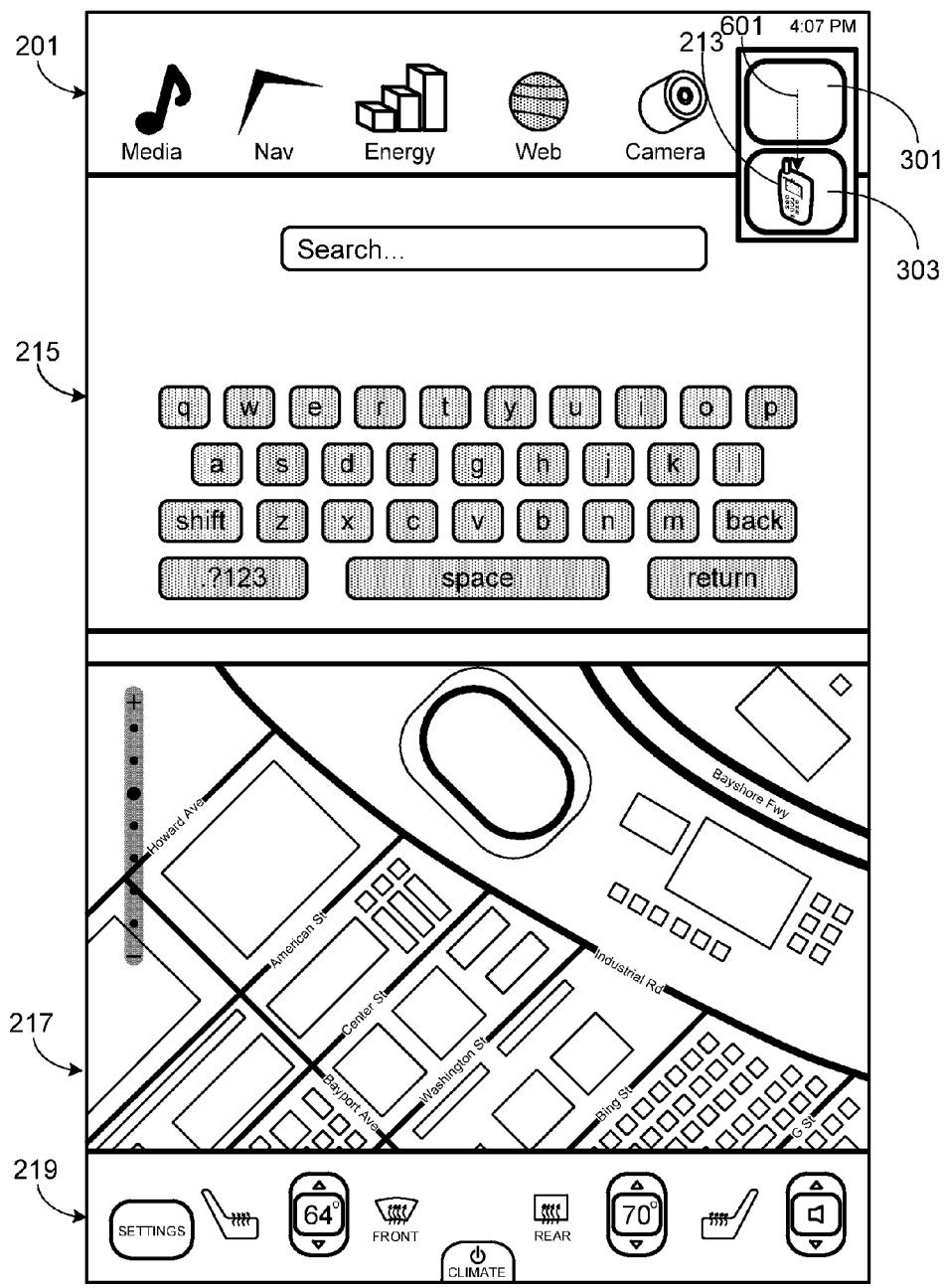
FIG. 7 illustrates the same view of the GUI screen as provided in FIG. 6 except for the continued motion of the phone application icon to the lower miniature window in the visual cue.

In FIG. 3 application 213 has just been selected and the user has not moved the phone icon. Therefore at this point in time the user is still touching icon 213 or otherwise still selecting icon 213, for example by holding a mouse cursor on icon 213 and still depressing the left mouse button (i.e., click-and-hold). Next, the user selects the window in which to launch the selected application. In order to select the launch window the user, while still selecting the icon, moves the icon to the desired window in the visual representation (i.e., the visual cue described above). For example, assuming a touch-screen display as well as a two window configuration as described above and illustrated in FIGS. 2 and 3, the user touches the icon of the application to be launched (e.g., phone icon 213) and then, while still holding the icon, slides the icon to the miniature window in the visual cue that represents the display window in which the application is to be launched. FIGS. 6 and 7 illustrate icon 213 being slid from its initial location to lower miniature window 303, thus causing the corresponding application, i.e., phone application, to be launched in the lower window 217. Dashed line 601 illustrates the dragging motion of icon 213 during this process (note that line 601 is not actually shown on the display in the preferred embodiment of the invention, but is meant only to illustrate the dragging motion of the icon in these figures).

Figure 8:
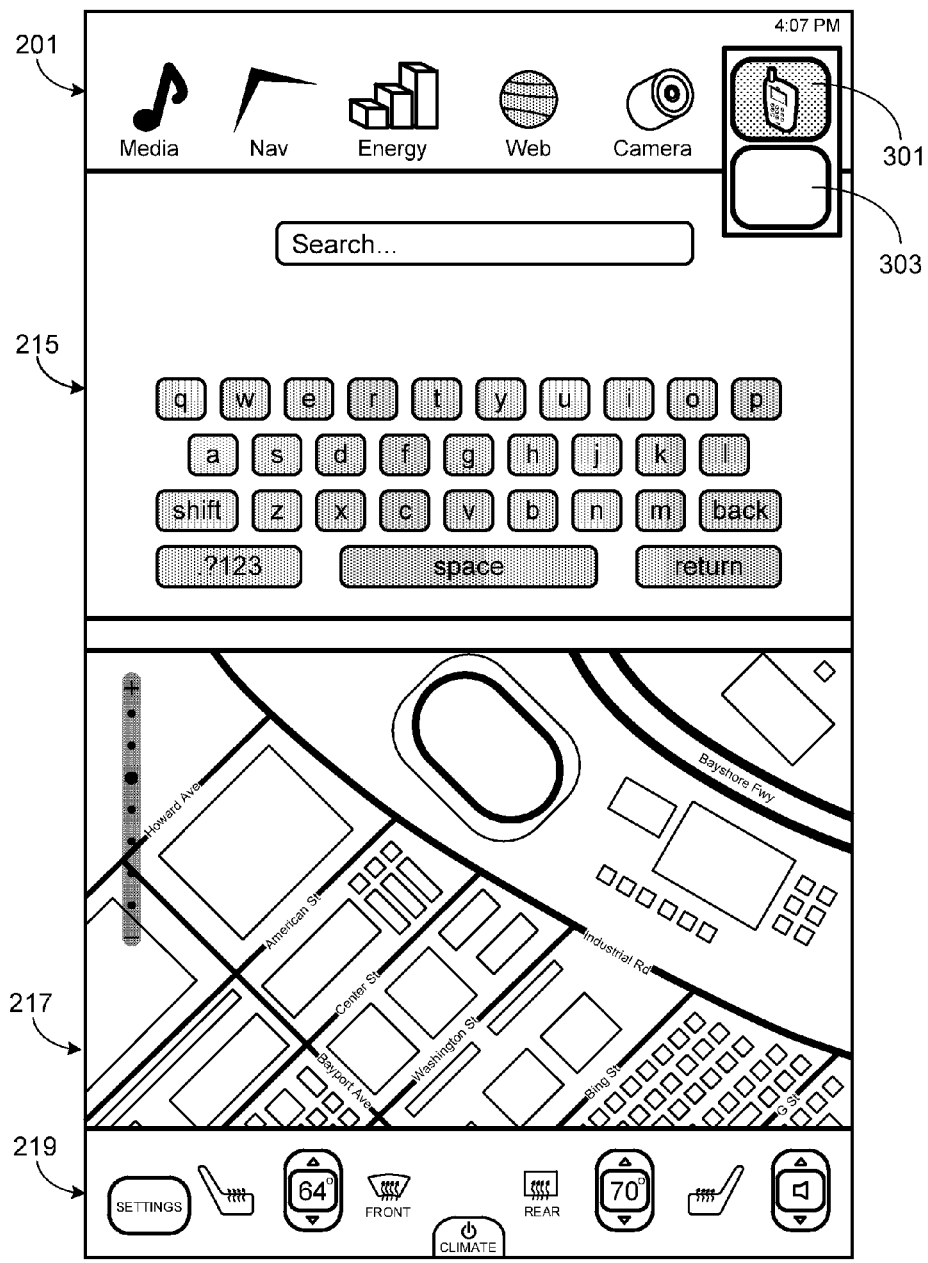
FIG. 8 illustrates the same view of the GUI screen as provided in FIG. 3 except that the mini-window corresponding to the currently destination window is highlighted.
Figure 9:
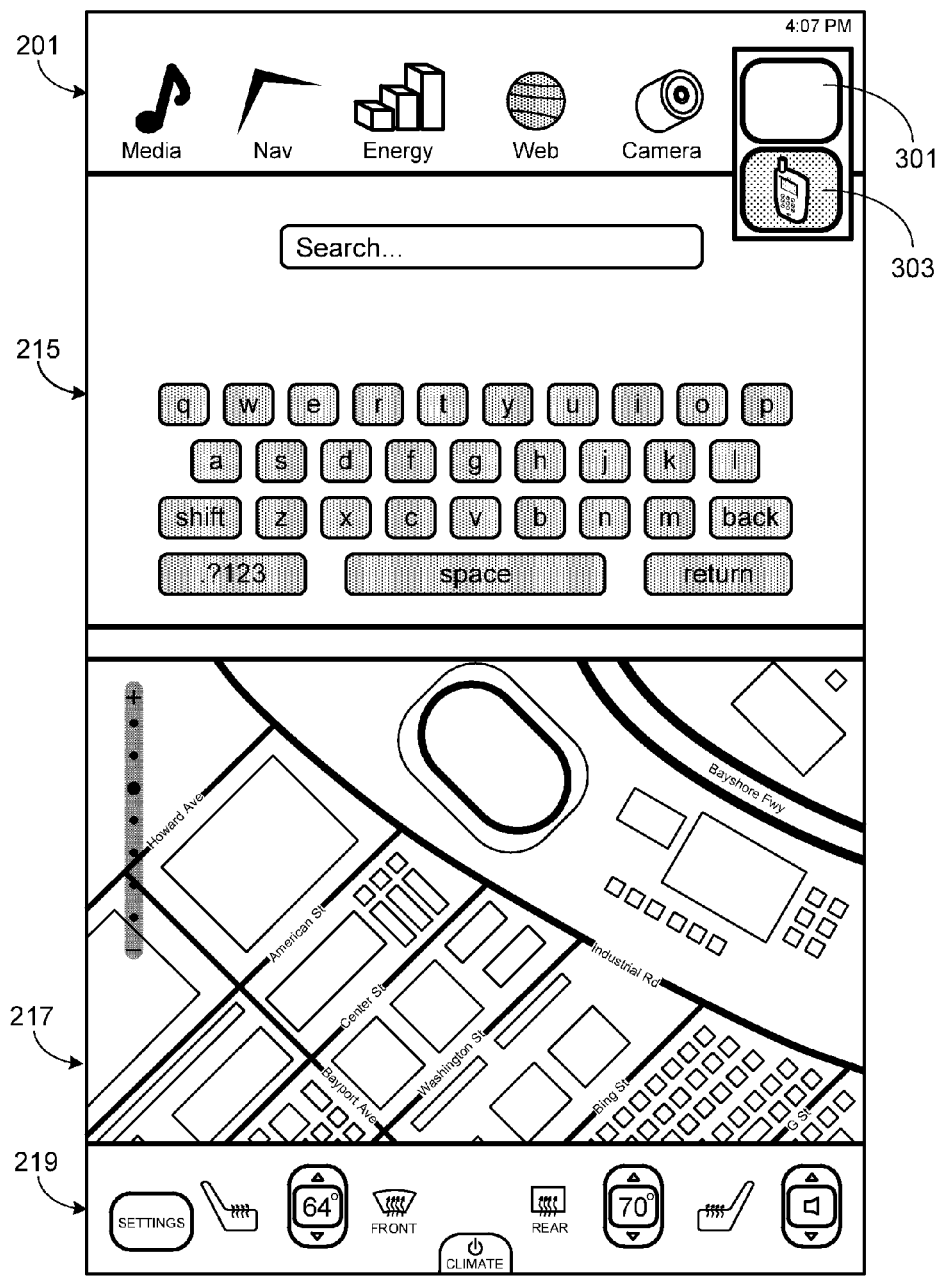
FIG. 9 illustrates the same view of the GUI screen as provided in FIG. 8 except that the application icon has been dragged from the upper to the lower visual cue window, thereby causing the highlighted mini-window to change from the upper mini-window to the lower mini-window.

In a preferred embodiment, the miniature window (e.g., mini-windows 301 and 303) of the visual cue in which the icon is currently located is highlighted, for example by shading the background, thus indicating in which window the selected application will launch. This form of highlighting, illustrated in FIGS. 8 and 9, aid the user in visualizing the launch window.

Figure 10:
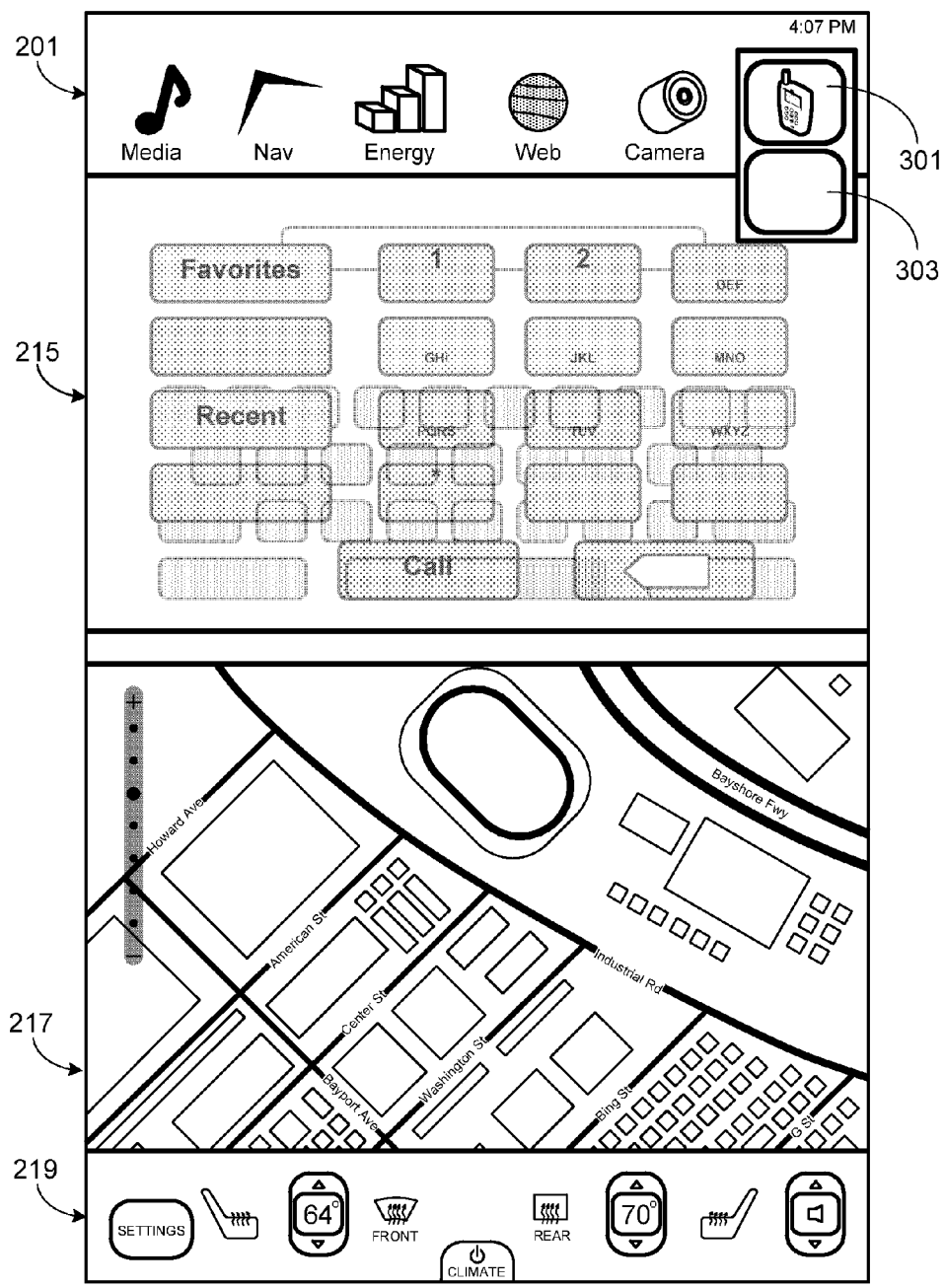
FIG. 10 illustrates the same view of the GUI screen as provided in FIG. 3 except that the selected application is displayed in a semi-transparent state as an overlay on the currently selected visual cue window.
Figure 11:
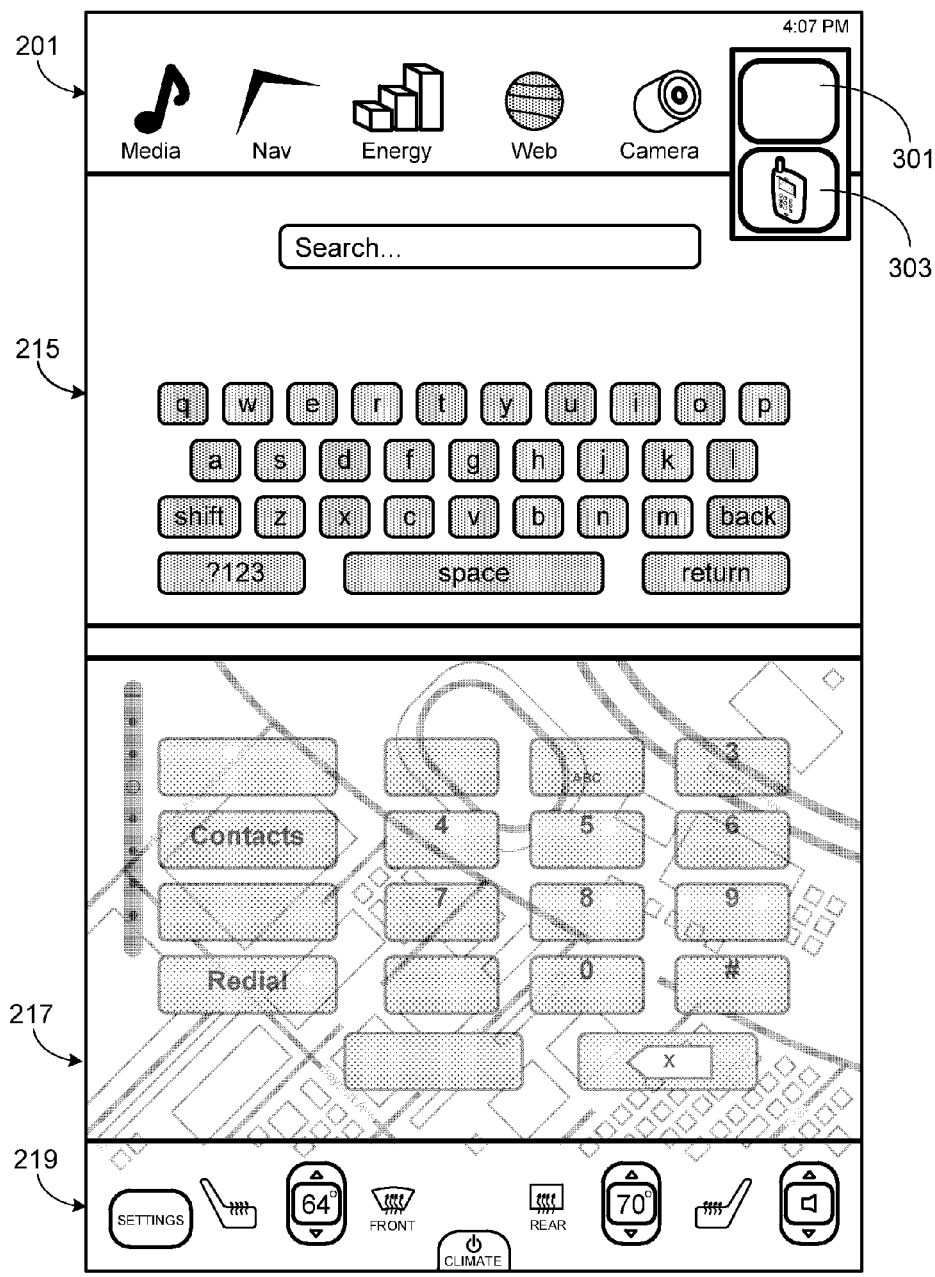
FIG. 11 illustrates the same view of the GUI screen as provided in FIG. 10 except that the application has been dragged from the upper to the lower visual cue window, thereby causing the selected application to be displayed in a semi-transparent state as an overlay on the lower window.

In another technique of indicating the launch window, which can be used alone or in conjunction with the mini-window highlighting technique, as the user drags the icon of the application to be launched over the miniature windows of the visual cue (i.e., mini-windows 301 and 303), the application will appear in a semi-transparent state as an overlay on the corresponding window (i.e., windows 215 and 217). Therefore when icon 213 is first selected and the user has not moved the icon out of upper visual cue window 301, the phone application will be visible over the browser application as illustrated in FIG. 10. If the user, prior to lifting their finger off of the screen (or unclicking the mouse button), moves icon 213 to lower visual cue window 303, then the phone application will be visible over the current lower window application (e.g., the navigation application in this example) as illustrated in FIG. 11.

Figure 12:
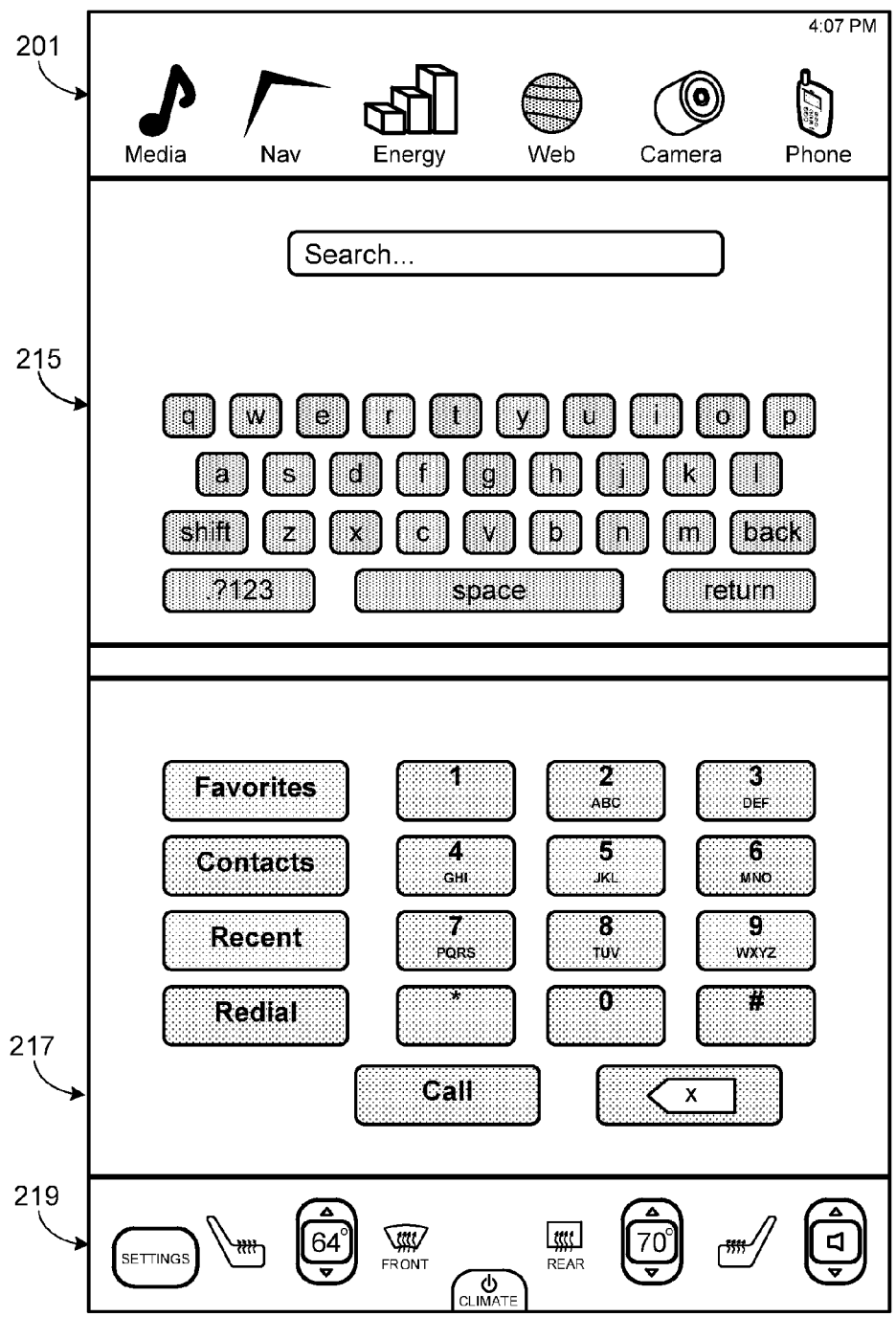
FIG. 12 illustrates the same view of the GUI screen as provided in FIG. 11 after the user has removed their finger from the touch-screen, or otherwise released the application, while the application icon is in the lower visual cue window.
Figure 13:
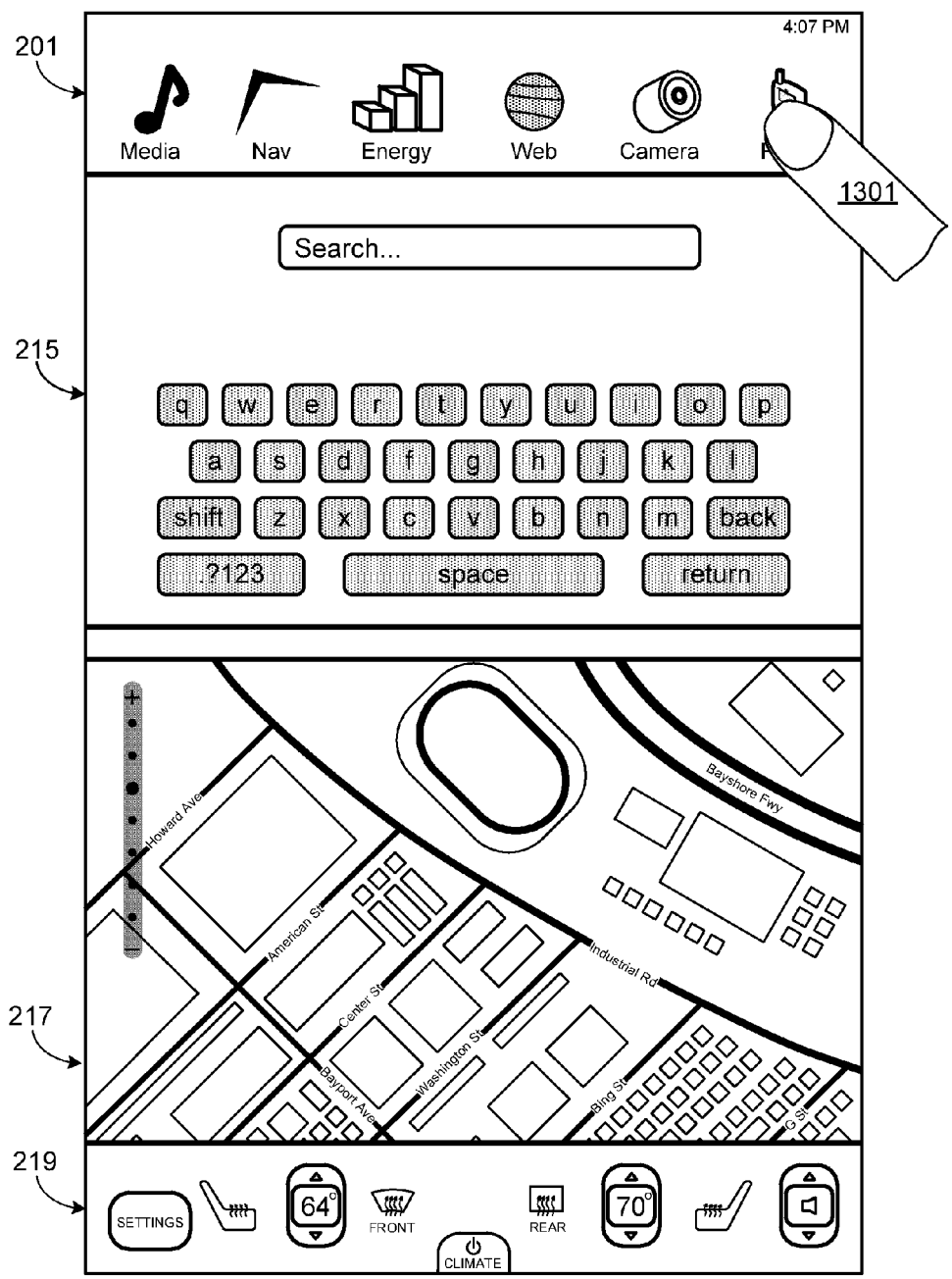
FIG. 13 illustrates the first step of an alternate embodiment in which the user selects an application icon from the taskbar and drags it to the window where it is to be opened.
Figure 14:
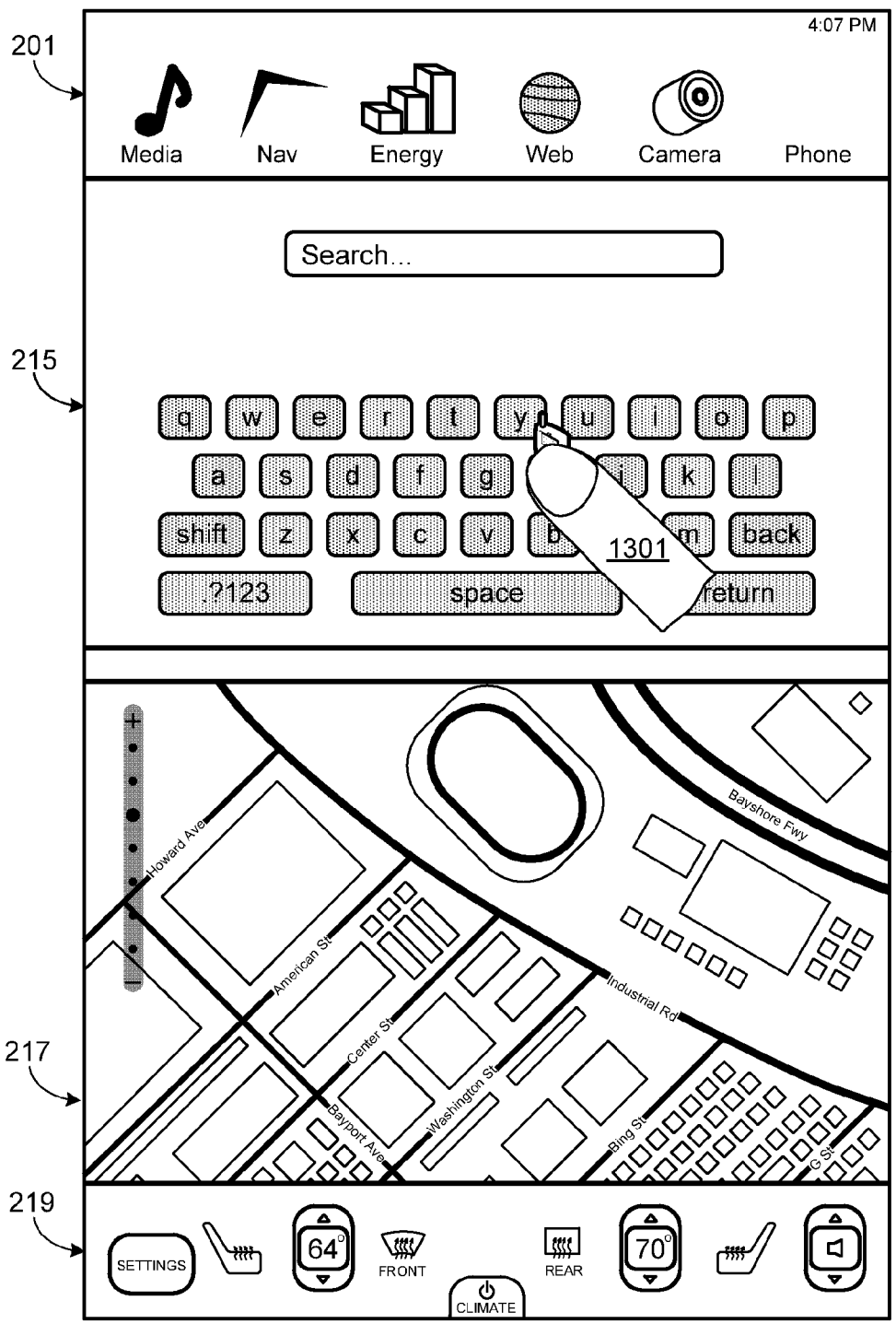
FIG. 14 illustrates a selected icon from the exemplary GUI screen shown in FIG. 2 in the process of being dragged to the destination window.
Figure 15:
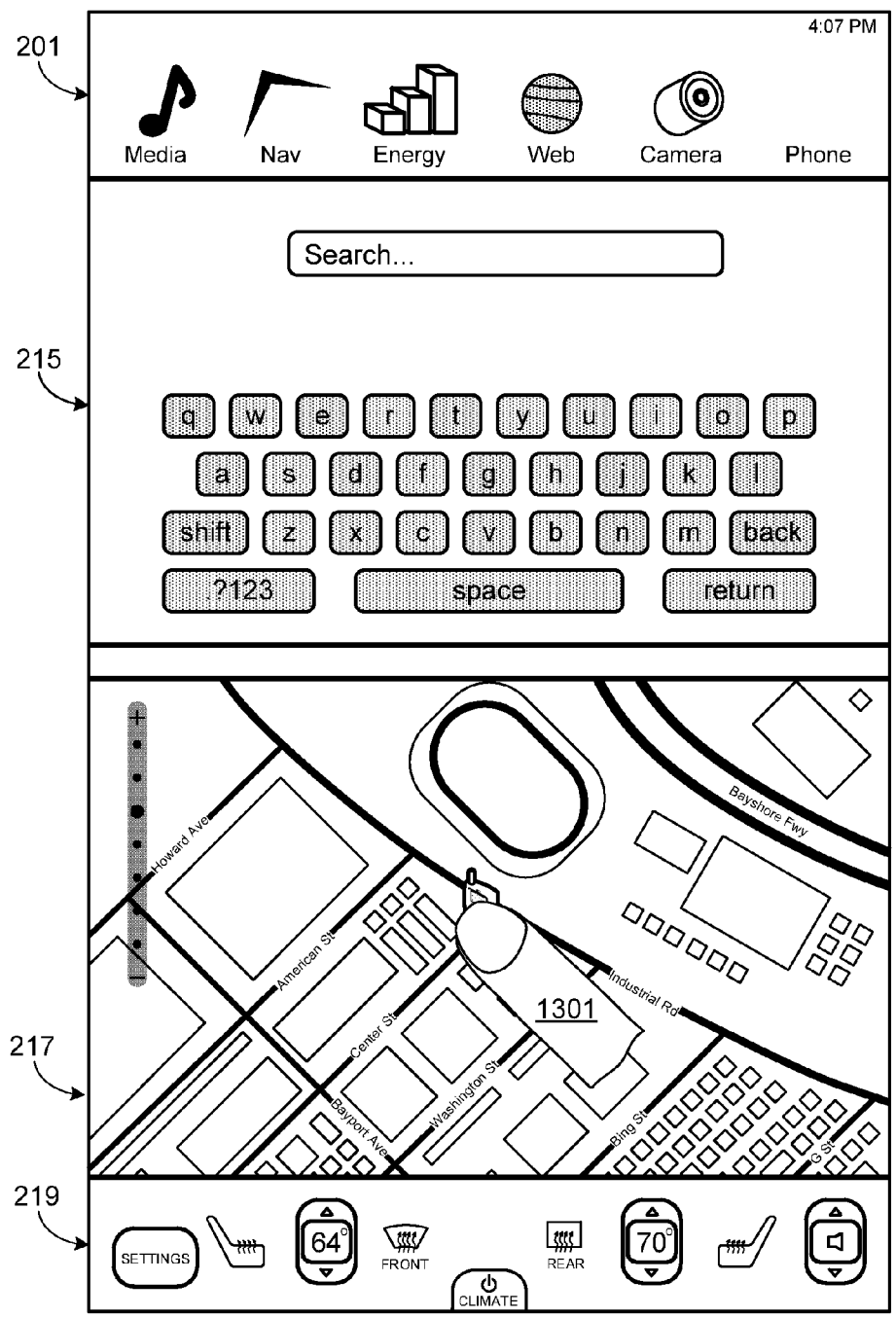
FIG. 15 illustrates the selected icon in the destination window.

After the user decides on the desired window for launching the selected application, they merely left their finger from the screen (or release the previously selected mouse button). At this point the selected application will completely materialize in the selected window, replacing the application previously displayed in that window. Thus, for example, if after moving icon 213 to lower visual cue window 303 as shown in FIG. 11, once the user lifts their finger from the touch-screen the phone application corresponding to selected icon 213 completely materializes in window 217 as illustrated in FIG. 12.

In an alternate embodiment, the user selects the window in which an application is to be launched by dragging the icon from the taskbar to the desired launch window and then releasing the icon. Preferably the dragging and release functions are performed by the user via touching, dragging and removing their finger from a touch-screen although this technique is equally applicable to non-touch-screens (e.g., using a mouse to select, drag and release the application icon). As in the prior embodiment, this technique requires that the GUI display screen be divided into two or more windows, each of which can be used to display a selected application (see, for example, screen 200 shown in FIG. 2 that includes an upper window 215 displaying web browser application 209 and a lower window 217 displaying a map selected via navigation interface application 205).

Figure 16:
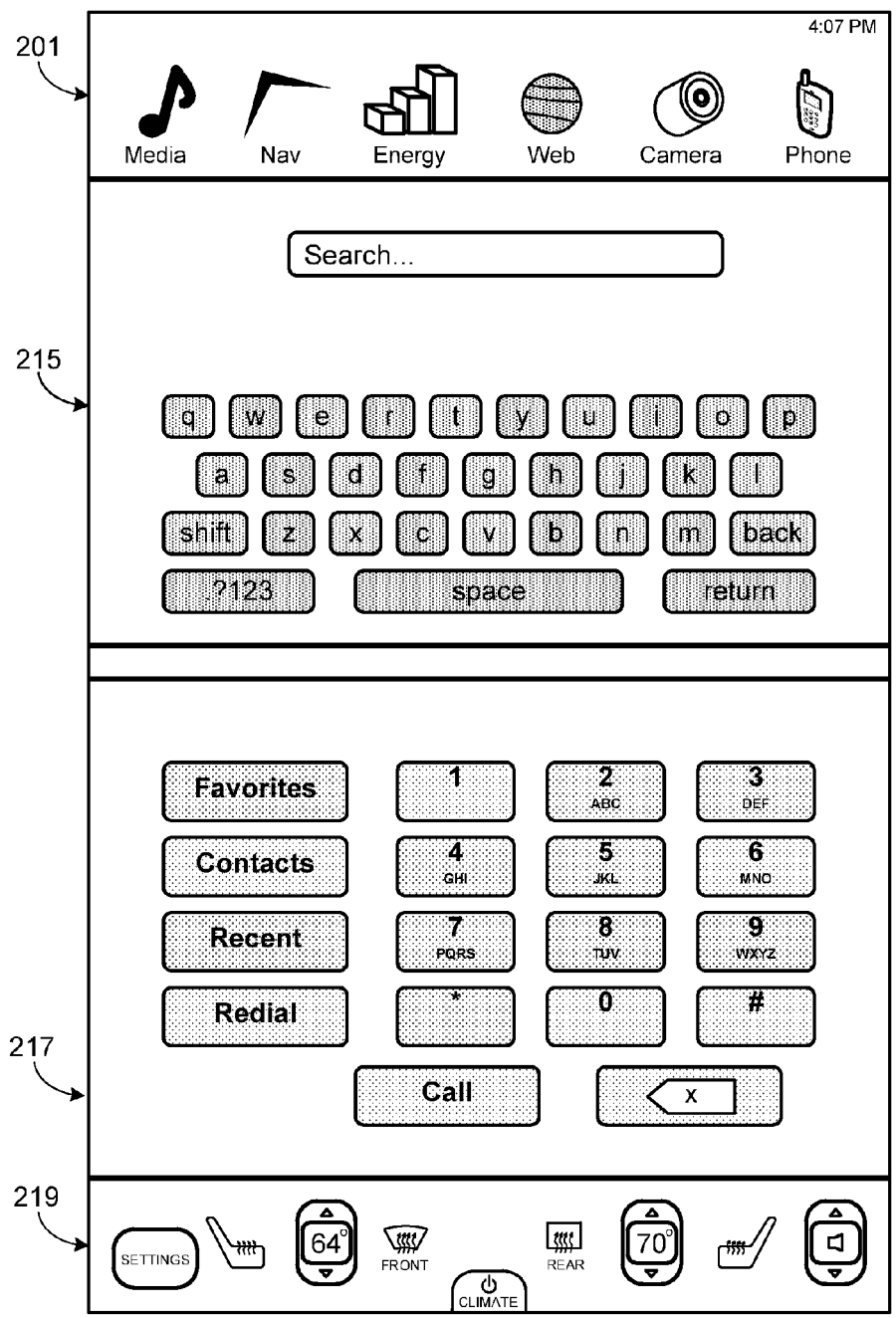
FIG. 16 illustrates the launch of the selected application once the user releases the selected icon.

FIGS. 13-16 illustrate a user's finger 1301 touching icon 213 (FIG. 13), dragging icon 213 downwards (FIG. 14) to lower window 217 (FIG. 15), and then releasing the icon FIG. 16. Upon release, the application associated with the selected icon, which in this example is the phone application, materializes in the selected window as shown in FIG. 16. As previously noted, in this embodiment a window is selected by placing the icon associated with the desired application, for example using a touch-and-slide motion on a touch-screen, anywhere within the window in which the application is desired.

Figure 17:
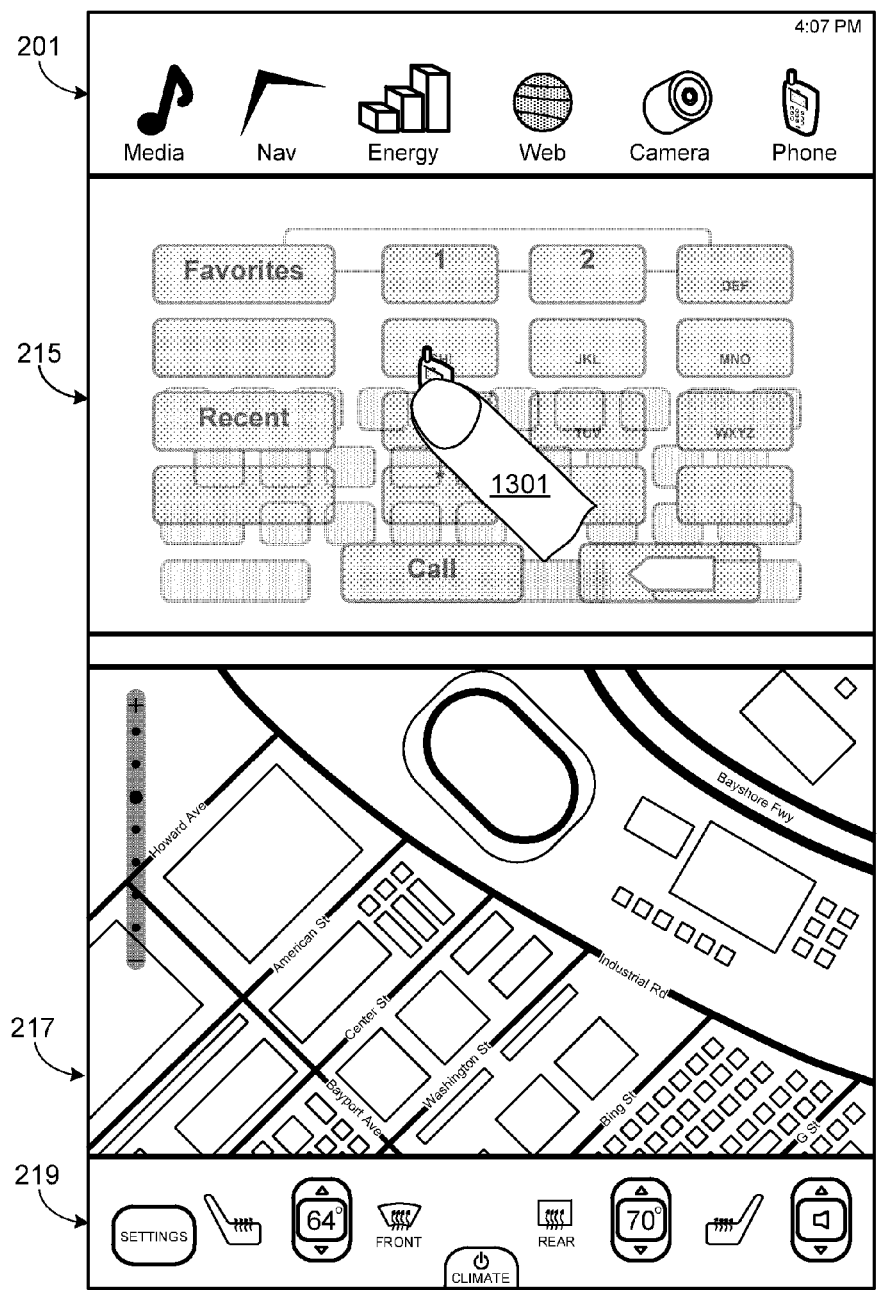
FIG. 17 illustrates a similar embodiment to that shown in FIG. 14, except that the selected application is displayed in a semi-transparent state as an overlay.
Figure 18:
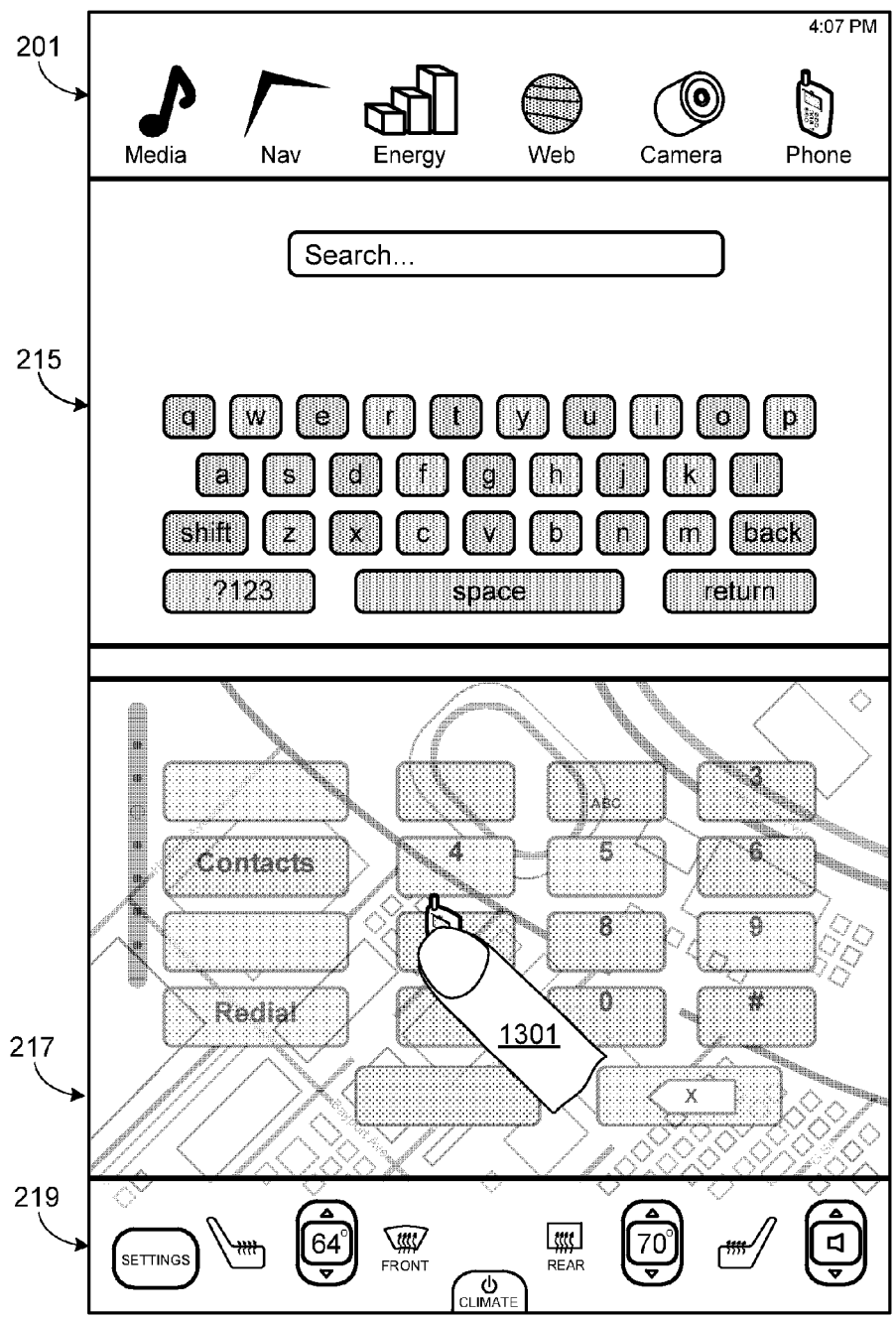
FIG. 18 illustrates a similar embodiment to that shown in FIG. 15, except that the selected application is displayed in a semi-transparent state as an overlay.

Preferably in this embodiment as the user drags the selected icon across the GUI display screen, the application associated with the selected icon partially materializes in whichever window the selected icon is currently within. Therefore as the user is dragging icon 213 across upper window 215 and then lower window 217, instead of the screens shown in FIGS. 14 and 15 the screens would include a semi-transparent view of the phone application overlaying the current application as illustrated in FIGS. 17 and 18.

Figure 19:
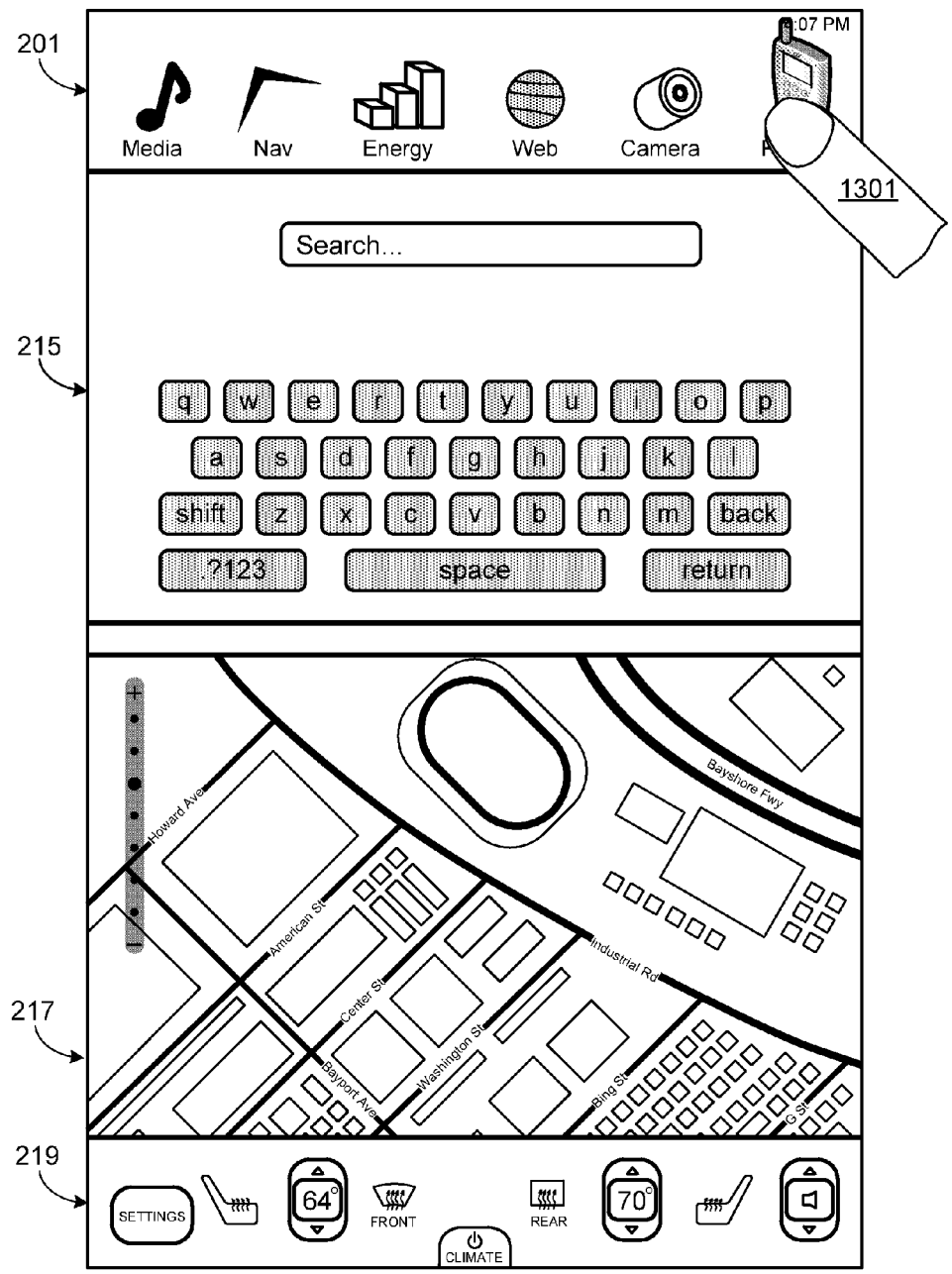
FIG. 19 illustrates a similar embodiment to that shown in FIG. 13, except that when the user selects an icon, the icon changes appearance.

Preferably in any of the previously described embodiments, when a user selects an icon, the icon changes in some small way, thus indicating to the user that the icon has been selected. For example, the icon can change size or color, thereby highlighting to the user that the icon has been selected. This feature is especially useful if the taskbar is crowded with icons, or if the invention is utilized in a car or other system in which the user may be distracted by other events, thereby making it difficult to accurately select a particular icon. This aspect is illustrated in FIG. 19, which is based on the view provided in FIG. 13, in which icon 213, after being selected, is enlarged and shaded.

While one of the goals of the present invention is to simplify the launch of an application within a window of a multi-windowed GUI display, it will be appreciated that the user may also wish to display the selected application in the entire display screen, i.e., covering all windows. In any of the previously described embodiments, preferably the user is able to toggle between a full-screen view and a partial-screen view in which the selected application is displayed in one window of a multi-windowed display screen by simply tapping on the icon corresponding to the application to be re-sized. Thus, for example, if the GUI display currently shows the screen shown in FIG. 2, by tapping on icon 205 the user can enlarge the navigation screen such that it covers the entire display screen (e.g., both upper window 215 and lower window 217). Tapping the same icon again will re-size the navigation screen such that it only covers lower window 217. Furthermore, in at least one preferred embodiment if the user wishes to launch an application in a full-screen mode, instead of using the visual cue approach described above relative to FIGS. 3-12 or the touch-and-slide approach described above relative to FIGS. 13-18, the user simply double taps (or double clicks) the icon associated with the desired application.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of launching a software application on a graphical user interface (GUI) screen of a display coupled to a system controller that provides access to a plurality of vehicular subsystems, the method comprising the steps of:
   providing a taskbar on a first portion of said GUI screen;
   displaying a plurality of icons within said taskbar, wherein each of said plurality of icons represents a corresponding one of a plurality of applications;
   configuring a second portion of said GUI screen into a plurality of windows, wherein each of said plurality of windows is pre-sized;
   receiving a user selection of a selected icon, wherein said selected icon is one of said plurality of icons located within said taskbar, and wherein said selected icon represents an application, of the plurality of applications, to be launched;
   determining, based on user input, that a user is dragging said selected icon from an initial location on said taskbar into a selected window of said plurality of windows;
   displaying a semi-transparent overlay, corresponding to the application to be launched, on at least one window of said plurality of windows as said selected icon is positioned within the at least one window; and
   launching the application in said selected window of said plurality of windows when determining that said selected icon is released by the user within said selected window, wherein the application provides at least one of control options or monitoring information relating to a vehicular subsystem of the plurality of vehicular subsystems.

2. The method of claim 1, wherein said GUI screen comprises a touch-screen, wherein receiving a user selection of said selected icon includes determining that the user is touching said selected icon on said touch-screen, and wherein determining that said selected icon is released by the user includes determining that the user is no longer touching said selected icon on said touch-screen.

3. The method of claim 1, wherein receiving a user selection of said selected icon includes determining that the user is placing a cursor over said selected icon with a mouse controller and performing a click-and-hold operation with a mouse controller button, and wherein determining that said selected icon is released by the user includes determining that the user unclicks said mouse controller button.

4. The method of claim 1, wherein launching the application further comprises completely materializing said semi-transparent overlay in said selected window when said selected icon is released.

5. The method of claim 1, wherein said plurality of applications includes one or more applications for controlling one or more of the plurality of vehicular subsystems.

6. The method of claim 1, wherein said GUI screen is mounted within a central console of a vehicle.

7. The method of claim 1, wherein said plurality of applications include at least one of an entertainment system application, a navigation system application, an energy tracking application, a browser application, a camera application or a phone application.

8. The method of claim 1, further comprising the step of providing a plurality of persistent controls on a third portion of said GUI screen.

9. The method of claim 8, wherein said plurality of persistent controls include at least one of:
   vehicle setting controls;
   passenger cabin temperature setting controls;
   vehicle seat warmer controls;
   audio volume controls; or
   defroster controls.

10. The method of claim 1, further comprising the step of altering an appearance of said selected icon after receiving said user selection of said selected icon.

11. The method of claim 10, wherein altering the appearance of said selected icon includes enlarging said selected icon.

12. The method of claim 10, wherein altering the appearance of said selected icon includes changing a color associated with said selected icon.

13. The method of claim 1, wherein following launching of the application, the method further comprises:
   in response to determining a user tap of said selected icon, toggling the selected window from a first window size to a second window size, wherein the second window size covers substantially all of said second portion of said GUI screen.

14. The method of claim 1, the method further comprises:
   when determining a double tap of said selected icon by a user, launching the application represented by said selected icon in a full screen mode.

* * * * *